(12) United States Patent
Kawai et al.

(10) Patent No.: US 9,927,757 B2
(45) Date of Patent: Mar. 27, 2018

(54) TONER DENSITY SENSOR AND IMAGE FORMING DEVICE

(71) Applicant: OMRON CORPORATION, Kyoto-shi, Kyoto (JP)

(72) Inventors: Hajime Kawai, Kyoto (JP); Junichi Maekawa, Otsu (JP); Masato Ueda, Uji (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 15/384,543

(22) Filed: Dec. 20, 2016

(65) Prior Publication Data
US 2017/0205748 A1    Jul. 20, 2017

(30) Foreign Application Priority Data

Jan. 15, 2016   (JP) .................................. 2016-006648

(51) Int. Cl.
*G03G 15/00*    (2006.01)
*G01J 1/02*    (2006.01)

(52) U.S. Cl.
CPC .......... *G03G 15/556* (2013.01); *G01J 1/0214* (2013.01); *G03G 15/5058* (2013.01); *G03G 2215/00059* (2013.01)

(58) Field of Classification Search
CPC .................. G03G 15/556; G03G 2215/00616
USPC ........................................................ 399/74
See application file for complete search history.

(56) References Cited

U.S. PATENT DOCUMENTS

| 2012/0237246 A1 | 9/2012 | Taishi et al. |
| 2013/0019459 A1 | 1/2013 | Lim et al. |
| 2013/0272740 A1* | 10/2013 | Nakagawa ............. G01N 21/55 399/74 |
| 2016/0170325 A1* | 6/2016 | Nagashima .......... G01N 21/474 399/74 |

FOREIGN PATENT DOCUMENTS

| JP | 2009-58520 A | 3/2009 |
| JP | 4531357 B2 | 8/2010 |
| JP | 5589914 B2 | 9/2014 |

OTHER PUBLICATIONS

The extended European Search Report dated May 12, 2017 in the counterpart European patent application.

* cited by examiner

*Primary Examiner* — Sandra Brase
(74) *Attorney, Agent, or Firm* — Metrolexis Law Group PLLC

(57) ABSTRACT

A toner density sensor includes: a light emitting element configured to radiate light; a light receiving element configured to receive the light emitted from the light emitting element and reflected from a detection object; a substrate whereon the light emitting element and the light receiving element are surface mounted; a case covering the light emitting element and the light receiving element; an optical path configured parallel to the substrate for light generated from the light emitting element; a groove provided in the substrate from the end part of the substrate in the direction light travels from the light emitting element to between the light emitting element and the light receiving element, the groove recessed from the mounting surface in the thickness direction of the substrate; and an insert provided to the case and configured for insertion into the groove.

15 Claims, 18 Drawing Sheets

Related Art

Related Art

Related Art

Related Art

TONER DENSITY SENSOR AND IMAGE FORMING DEVICE

FIELD

The present invention relates generally to a toner density sensor used in an image forming device such as a copier, printer, or facsimile machine. The present invention more specifically relates to a toner density sensor capable of improving detection accuracy, and to an image forming device.

BACKGROUND

The toner density sensor is the most important component in an image forming device for providing optimal image quality. The toner density sensor includes a light emitting element that radiates light, a light receiving element, and an amplifier. The light receiving element receives the light radiating from the light-emitting element and reflected from the detection object; the amplifier increases the amplitude of the detection voltage from the light receiving element.

The image forming device may be configured to form images using an intermediate transfer process where a toner image formed on an intermediate transfer belt through primary transfer is then formed on paper through secondary transfer. In this case, the toner density sensor irradiates the intermediate transfer belt with light from the light emitting element, and uses the light receiving element to detect the light reflected by the toner image on the intermediate transfer belt. The light receiving element generates a photoelectric current in response to the received light intensity. The image forming device detects the density of the toner on the intermediate transfer belt by detecting the voltage from the photoelectric current generated. Consequently, the image forming device then makes optical or electrical adjustments on the basis of the detection results.

Note that the light emitting element and the light receiving element may be mounted on the surface of a substrate (printed substrate) in the toner density sensor, and the sensor may be configured so that the optical path from the light emitting element runs parallel to the substrate; this created a problem where light radiating in directions other than a prescribed direction along the optical path creates optical noise. This optical noise may also be called stray light; stray light reduces the detection accuracy.

That is, light radiating from the light emitting element mounted to the surface of a substrate contains desirable components that travel toward the detection object. However, this light also contains components traveling in other directions, such as components traveling towards another device on the substrate, or components traveling toward the substrate where a portion thereof enters substrate. When light components other than the desirable components traveling towards the detection object arrives at the light receiving element, the non-desirable components change the value of the detection voltage, making highly accurate detection less likely to take place.

The optical noise, which causes the detection accuracy to degrade, comes from components that travel into the substrate and reach the light receiving element, and components that travel through the air outside the substrate and reach the light receiving element. The optical noise traveling outside the substrate can be considered separately as the optical noise traveling through the air in the plane of the substrate, and the optical noise traveling through the air outside the substrate in a plan view of the substrate.

Phenolic resin (applied to paper) and glass-epoxy resin and the like are typically used for substrates. These resins provide comparatively good optical transmittance. Therefore, light entering the substrate will reflect inside the substrate while a portion of the light radiates outside the substrate from the area surrounding the light receiving element that has no copper foil, thereby reaching the light receiving element.

Japanese Patent No. 4531357 attempts to minimize this kind of optical noise that travels inside the substrate. More specifically, Japanese Patent No. 4531357 proposes providing a slotted through-hole between the light emitting element and the light receiving element which are mounted on the surface of the substrate. With this configuration, the optical noise traveling inside the substrate radiates from the through-hole. Consequently, the configuration reduces the amount of optical noise reaching the light receiving element. Japanese Patent No. 4531357 also proposes providing a light shielding component on a case that covers the light emitting element and the light receiving element. The light shielding element inserts into the through-hole.

Technical Problem

The light emitting element 102 and the light receiving elements 103, 104 are typically arranged near each other on the substrate 105 in a toner density sensor 101, as illustrated in FIG. 9, to reduce the size of the sensor. In FIG. 9, the reference numeral 116 refers to a case that covers the light emitting element 102 and the light receiving elements 103, 104, and the reference numeral 107 refers to a lens.

The light receiving elements may be arranged further behind the light emitting element relative to the detection object (not shown) as with the toner density sensor in Japanese Patent No. 4531357. Because the optical noise traveling through the air outside the substrate tends not to reach the light receiving elements in this case, the optical noise traveling inside the substrate has a greater effect on detection than the optical noise traveling through the air outside the substrate.

The light emitting element 102 and the light receiving elements 103, 104 may be positioned with little offset relative to the detection object (not shown; FIG. 9). The light emitting element 102 and the light receiving elements 103, 104 may also be brought nearer each other as in the toner density sensor 101 depicted in FIG. 9. With this configuration, the optical noise traveling inside the [light receiving element] substrate 105 has a greater effect than the optical noise traveling through the air outside the substrate 105.

The configuration described in Japanese Patent No. 4531357 could be incorporated into the toner density sensor 101 illustrated in FIG. 9 (refer to FIG. 10). However, even if a slotted through-hole 111 were provided in the substrate 105 between the light emitting element 102 and the light receiving elements 103, 104 as illustrated in FIG. 10, the optical noise outside the substrate 105, which has a greater effect, cannot be blocked.

The inability to block optical noise in this case is explained with reference to FIGS. 7B and 7C, which are also used when describing an embodiment. FIG. 7B depicts the effects of a light shielding component 123 inserted into a slotted through-hole 111 (FIG. 10) provided to a toner density sensor 101 (FIG. 9). FIG. 7C depicts the effects when the light shielding component 123 is a different shape. The reference numerals 117, 118 represent an upper case, and a lower case making up the case 116. The light shielding component 123 is incorporated inside the upper case 117, and the lower end of the light shielding component 123 reaches the lower surface (outer surface) of the lower case 118.

The through-hole 111 and light shielding component 123 inserted therein effectively block the optical noise traveling inside the substrate 105 when the slotted through-hole 111 is provided as illustrated in FIG. 10. More specifically, with the presence of the through-hole 111 between the light emitting element 102 and the light receiving elements 103, 104, light exits from the inner surface of the through-hole 111 to outside the substrate 105. Therefore, less light remains in the substrate 105, travels through the substrate 105, and exits from near the light receiving elements 103, 104. At this point, of the light exiting from one of the inner surfaces of the through-hole 111 to outside the substrate 105, some light is re-incident on the opposite inner surface of the through-hole 111 and travels inside the substrate 105 toward the light receiving elements 103, 104. Some light also travels through the air outside the substrate 105, and reaches the light receiving elements 103, 104. However, these components are blocked by the inside of the through-hole 111 and above the same by the light shielding component 123 inserted in the through-hole 111.

If, as illustrated in FIG. 7B, the light shielding component 123 sufficiently protrudes above the substrate 105 (the mounting surface) when inserted in the through-hole 111, the light shielding component 123 can effectively block optical noise traveling linearly toward the light receiving elements 103, 104 in the plan view of FIG. 10 along the substrate 105 in the air outside the substrate 105 (arrow Y1).

However, even if the light shielding component 123 were a sufficient height, as illustrated in FIG. 10 the light shielding component 123 cannot block optical noise traveling in the plane of the substrate 105 near the end part 105a of the substrate in the direction light travels from the light emitting element (arrow Y2) nor can it block optical noise traveling in the air outside the substrate 105 in a plan view (arrow Y3).

Note that, as illustrated in FIG. 7C, conceivably, the shape of the light shielding component 123 is such that the light shielding component 123 extends above the substrate 105 at the end 105a and is incorporated into a wall 124. However, the precision in machining and assembling the upper case 117 is insufficient compared to the optical wavelength in use. Therefore, the optical noise that wraps around the front of the substrate propagates along the surface of the substrate 105 via a path P between the substrate 105 and the lower end of the wall 124 and reaches the light receiving element 103 (104). Additionally, the optical noise traveling through the air outside the substrate 105 in plan view (arrow Y3) cannot be blocked.

The slotted through-hole 111 provided in the substrate 105 reduces the mechanical strength of the substrate, making it likely that the substrate may be damaged. More specifically, when the substrate 105 is provided with the slotted through-hole 111 illustrated in FIG. 10, the lengthwise direction of the through-hole 111 essentially becomes a short side in the rectangle making up substrate 105. Therefore, this increases the likelihood that the substrate 105 may snap along the through-hole 111, reducing the mechanical strength of the substrate at the through-hole.

In view of the foregoing issues, embodiments of the present invention provide a durable toner density sensor that can prevent optical noise from reducing the detection accuracy even when the light emitting element and the light receiving element are brought closer together to reduce the size of the sensor.

SUMMARY

To address the forgoing issues, embodiments of the invention are directed to a toner density sensor provided with a light emitting element configured to radiate light; a light receiving element configured to receive the light emitted from the light emitting element and reflected from a detection object; a substrate whereon the light emitting element and the light receiving element are surface mounted; a case covering the light emitting element and the light receiving element; an optical path configured parallel to the substrate for light generated from the light emitting element; a groove provided in the substrate from the end part of the substrate in the direction light travels from the light emitting element to between the light emitting element and the light receiving element, the groove recessed from the mounting surface in the thickness direction of the substrate; and an insert provided to the case and configured for insertion into the groove.

The embodiment treats light emitted from the light emitting element and radiating in a direction other than along the desired optical path as optical noise. In the above configuration the optical noise that enters inside the substrate and travels therethrough exits the substrate from the inner surface of the groove. Therefore, less light remains inside the substrate and advances therethrough to exit the substrate near the light receiving element. At this point, of the light exiting from the inner surface of the groove to outside the substrate, some light is re-incident on the opposite inner surface of the groove and travels inside the substrate toward the light receiving element. Some light also travels through the air outside the substrate, and reaches the light receiving element. However, these components are blocked by the inside of the groove and thereabove by the insert in the groove.

Here, the groove originates at the end part of the substrate that lies in the direction light travels from the light emitting element, and an insert is placed in the groove. The configuration of course blocks optical noise traveling linearly from the light emitting element to the light receiving unit, and is effective even for optical noise that travels through the air in the plane of the substrate, which has a greater influence on detection accuracy than the kind of optical noise that travels inside the substrate. As above described, the configuration also effectively blocks the optical noise that would wrap around at the end part of the substrate and reach the light receiving element.

Configuring the groove so that the length direction of the groove intersects with the end part of the substrate in the direction light travels from the light emitting element, allows the light emitting element and the light receiving element to be arranged closer together. This allows for a smaller toner density sensor.

Moreover, when the light emitting element and the light receiving element are arranged along the long side of a rectangular substrate, forming a slit through-hole extending along the shorter side makes the substrate susceptible to breaking. However, providing the groove structure maintains the mechanical strength of the substrate, while allowing for a reduced size and a solid construction.

Additionally, it is easier to modify the cross sectional shape of the groove structure than the cross sectional shape of the through-hole. Therefore, it is easier to come up with a shape that makes it difficult for light advancing inside the substrate to exit the substrate to the outside, thereby reducing the amount of optical noise.

A toner density sensor according to the embodiments of the invention may be further configured such that the groove extends to behind the light emitting element and the light receiving element.

The above describe configuration ensures the groove is long enough to reach behind the light emitting element and the light receiving element; therefore the configuration prevents further propagation of the optical noise traveling inside the substrate up to the portion behind the light emitting element and the light receiving element, and reduces the amount of optical noise.

A toner density sensor according to embodiments of the invention may be further configured such that the insert is long enough to reach the furthest part of the groove opposite said end part of the substrate when inside the groove.

Hereby, the insert effectively blocks the optical noise up to the furthest end of the groove. In particular, the insert effectively blocks optical noise traveling along the substrate that re-enters the substrate from an opposing inner surface after exiting from the other inner surface of the groove and travels toward the light receiving element; the insert also effectively blocks optical noise traveling toward the light receiving element through the air after exiting the inner surface of the groove, and optical noise traveling toward the light receiving element in the air in the plane of the substrate.

A toner density sensor according to embodiments of the invention may be further configured such that the insert is long enough to at least reach the end part of the substrate when inside the groove.

Hereby, the insert effectively blocks the optical noise up to the tip end of the groove. In particular, the insert effectively blocks optical noise traveling along the substrate that re-enters the substrate from an opposing inner surface after exiting from the other inner surface of the groove and travels toward the light receiving element; the insert also effectively blocks optical noise traveling toward the light receiving element through the air after exiting the inner surface of the groove, and optical noise traveling toward the light receiving element in the air in the plane of the substrate.

A toner density sensor according to embodiments of the invention may be further configured such that the insert is long enough to protrude from said end part to outside the substrate when inside the groove.

This configuration effectively blocks optical noise traveling through the air outside the plane of the substrate and around the end part outside the substrate toward the light receiving element, thereby further improving detection accuracy.

A toner density sensor according to embodiments of the invention may be further configured such that the depth of the groove is no less than half the thickness of the substrate.

The above described configuration effectively reduces the amount of optical noise that travels through the section of the substrate below the groove and reaches the light receiving element.

A toner density sensor according to embodiments of the invention may be further configured such that the cross-sectional shape of the groove widthwise is a V-shape or a trapezoidal shape.

The trapezoid or V cross-sectional shape in the width direction of the groove causes the light advancing inside the substrate to reflect or refract from the side surfaces (cross section) of the groove. Therefore, this reduces the overall amount of light progressing through the substrate that exits the substrate. Further, given that refraction is taking place, this also reduces the component of light that exits from the side surface of the groove near the light emitting element and advances toward the light receiving element. The configuration also reduces the amount of light that re-enters the substrate from the side surface of the groove near the light receiving element after exiting from the side surface of the groove near the light emitting element, and propagates through the gap between the bottom of the groove and the lower end of the insert. Thus, the light tends not to reach the light receiving element which is arranged on the outside of the substrate and consequently, the configuration effectively reduces the amount optical noise.

A toner density sensor according to embodiments of the invention may be further configured such that the inner surface of the groove is provided with a metal layer, a resist layer, or both metal and resist layers.

Hereby the metal layer, or the resist layer on the inner surface of the groove reflects light advancing inside the substrate toward the light emitting element within the substrate, and thus the light no longer exits the substrate. As a result, there is no longer light that exits the substrate from the groove and advances toward the light receiving element in the space outside the substrate, nor is there light that exits from the inner surface of the groove, re-enters the groove from the opposite inner surface and advances toward the light receiving element. Therefore, the configuration effectively and even further reduces the amount of optical noise reaching the light receiving element.

A toner density sensor according to the embodiments of the invention may be further configured such that the space between the groove and the insert is filled with a light shielding resin.

Hereby, the light shielding resin filling the space between the groove and the insert blocks the light exiting from the inner surface of the groove and advancing toward the light receiving element in the space outside the substrate. The configuration also blocks the light exiting from the inner surface of the groove, re-entering the substrate from the opposite inner surface and advancing toward the light receiving element. Therefore, the configuration effectively and even further reduces the amount of optical noise reaching the light receiving element.

A toner density sensor according to the embodiments of the invention may further include: a corrugated surface provided at the underside of the substrate in a section corresponding to the groove, with the width of the corrugated surface wider than the groove.

Hereby, the corrugated surface, which is provided at the underside of the substrate in a section corresponding to the groove, with the width of the corrugated surface wider than the groove, diffuses the light advancing inside the substrate and reduces the amount of light reflected from the underside of the substrate and advancing inside the substrate toward the light receiving element. The corrugated surface may be created by removing parts of the surface of the substrate. In this case, some light advancing inside the substrate may exit to the outside from the corrugated surface (i.e., exit from the side opposite the mounting surface of the substrate). Therefore, less light propagates inside the substrate toward the light receiving element. Thus, the light tends not to reach the light receiving element which is arranged on the outside of the substrate and consequently, the configuration effectively reduces the amount optical noise.

An image forming device provided with a toner density sensor according to embodiments of the invention is also within the scope of the invention.

Effects

Embodiments of the invention provide a durable toner density sensor that can prevent optical noise from reducing the detection accuracy even when the light emitting element and the light receiving element are brought closer together to reduce the size of the sensor.

BRIEF DESCRIPTION OF THE DRAWINGS

FIG. 7A illustrates a toner density sensor according to the embodiment; FIG. 7B illustrates the toner density sensor in FIG. 9, with the slotted through-hole provided as in FIG. 10 and a light shielding component inserted therein; FIG. 7C illustrates a toner density sensor configured as in FIG. 7B with a light shielding component having a different shape;

DETAILED DESCRIPTION

Figure 1:
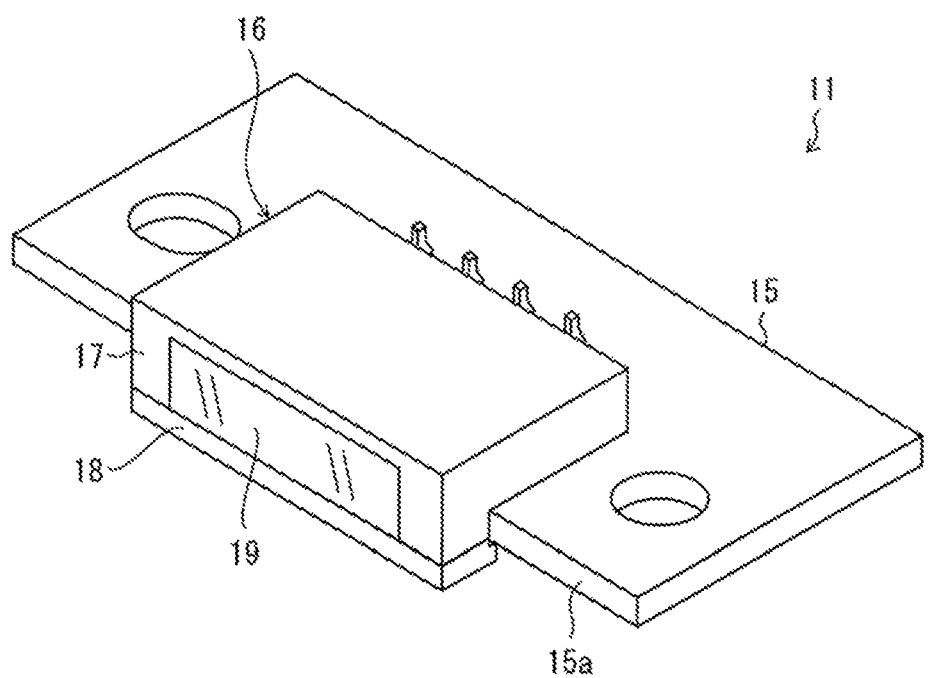
FIG. 1 is a perspective view of a toner density sensor according to a first embodiment.
Figure 2:
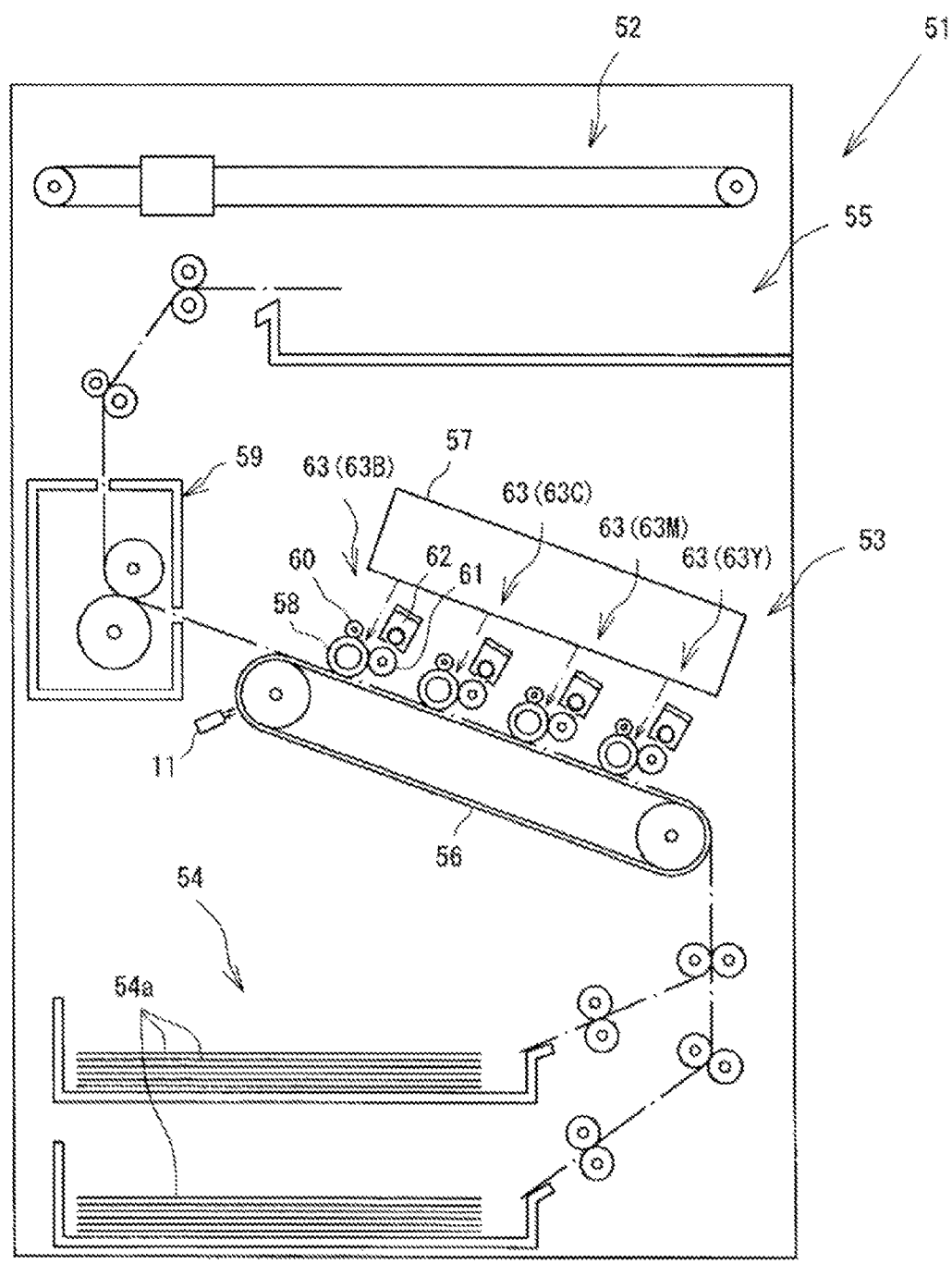
FIG. 2 illustrates a general configuration of an image forming device with the aforementioned toner density sensor installed.

Embodiments of the invention are described below in detail. FIG. 1 is a perspective view of a toner density sensor 11 according to a first embodiment. FIG. 2 depicts a general configuration of an image forming device 51 with the toner density sensor 11 installed.

As illustrated in FIG. 1, toner density sensor 11 is configured from a rectangular substrate 15 with a box-shaped case 16, and a lens 19 installed along one long side of the substrate 15. This kind of toner density sensor 11 can be mounted in, for instance, the kind of image forming device 51 illustrated in FIG. 2. The image forming device 51 may be a color laser printer, for example. First, the general structure of an image forming device 51 is described.

The image forming device 51 possesses a document reader 52 at the top part of the device. An image creating module 53 creates an image on the basis of the document data read by the document reader 52. A paper feeder 54 provided at the bottom part of the device feeds in paper 54a, and once the image forming device 51 transfers the image to the paper 54a, a paper ejector 55 at the top part of the device ejects the paper 54a. A transfer belt 56 extends the length of the image creating module 53. A photosensitive drum 58 is exposed to light from an optical writing device 57, causing toner to adhere to the photosensitive drum 58. The toner is transferred to the transfer belt 56 and an image is formed thereon. At this point, the above-mentioned image is then transferred from the transfer belt 56 to the paper 54a when the paper is fed. Hereafter the paper 54a is conveyed to a fuser unit 59 where the toner is set on the paper 54a with heat and pressure.

In the drawing, the reference numerals 60, 61, 62 refer to a charging roller, developer sleeve, and a toner case. These components, and the photosensitive drum 58 are arranged along with four color cartridges, i.e., yellow 63Y, magenta 63M, cyan 63C, and black 63B, to constitute an image creation unit 63.

The above-described toner density sensor 11 is provided facing the transfer belt 56 in the above kind of image forming device 51; the toner density sensor 11 detects the density of the toner on the transfer belt 56. The toner density sensor 11 may also be provided in the above-mentioned image creation unit 63. In this case, the toner density sensor 11 may detect the density of the toner on the above-mentioned photosensitive drum 58.

Figure 3:
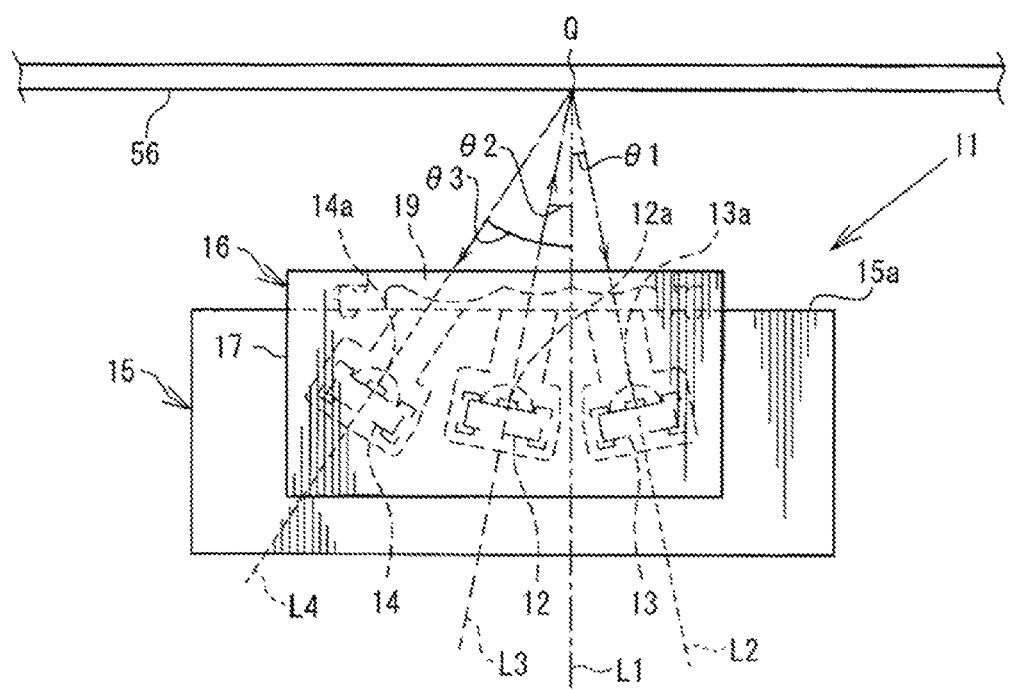
FIG. 3 is a front view of the general configuration of the aforementioned toner density sensor.
Figure 4:
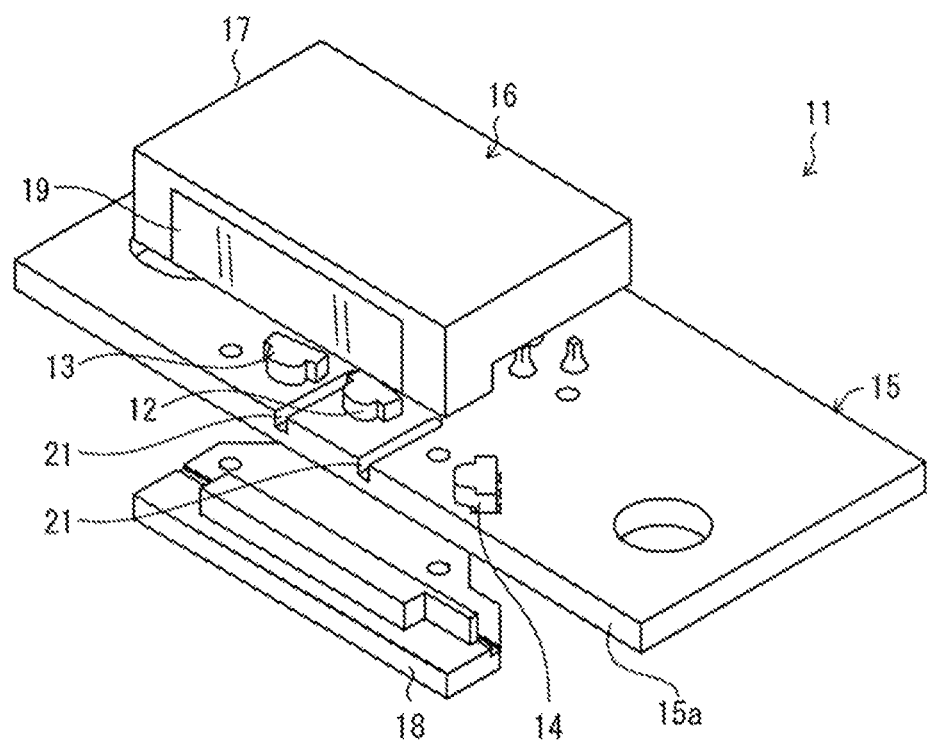
FIG. 4 is an exploded perspective view of the aforementioned toner density sensor.
Figure 5:
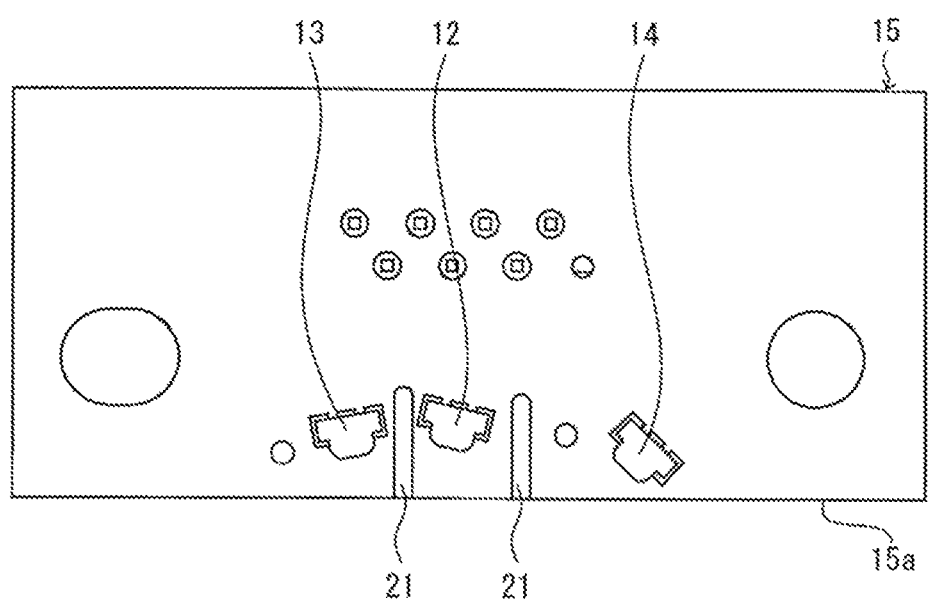
FIG. 5 is a plan view of a constituent component in the aforementioned toner density sensor, namely the substrate with a light emitting element and light receiving elements mounted thereon.
Figure 6A:
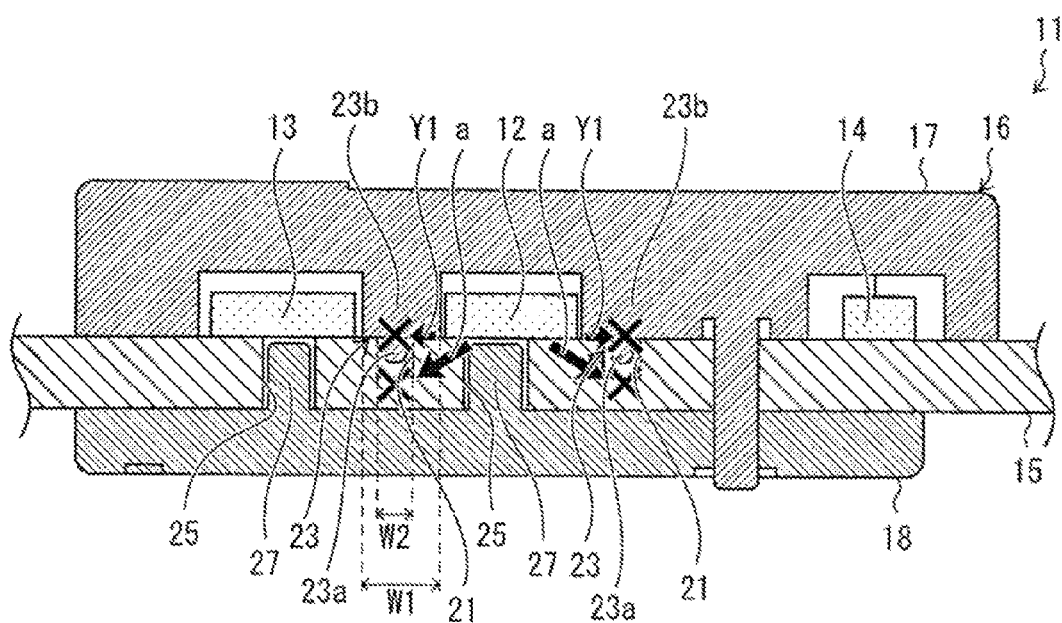
FIG. 6A is a cross-sectional view of the aforementioned toner density sensor.
Figure 6B:
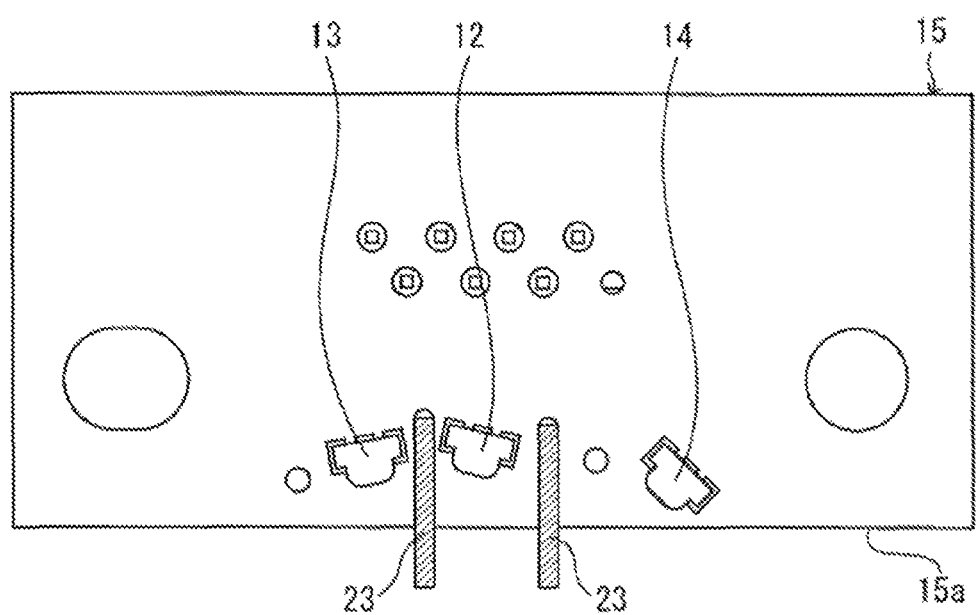
FIG. 6B is for describing the positional relationship between a groove, an insert, the light emitting element and the light receiving elements in the aforementioned toner density sensor.

The toner density sensor 11 is described next. FIG. 3 is a front view depicting the general configuration of the toner density sensor 11; FIG. 4 is an exploded perspective view of the toner density sensor 11. FIG. 5 is a plan view of a constituent component in the toner density sensor 11. Namely, FIG. 5 is a plan view of the substrate 15 with a light emitting element 12 and light receiving elements 13, 14 mounted thereon. FIG. 6A is a cross-sectional view of the toner density sensor 11; FIG. 6B is for describing the positional relationship between a groove 21, an insert 23, the light emitting element 12 and the light receiving elements 13, 14 in the toner density sensor 11;

As illustrated in FIG. 3, the toner density sensor 11 includes a light emitting element 12 that radiates light, light receiving elements 13, 14, lenses or element covers 12a, 13a, and 14a, and an amplifier (not shown). The light receiving elements 13, 14 receive the light radiated from the light emitting element 12 and reflecting from the transfer belt 56, which is the detection object; the amplifier increases the amplitude of the detection voltage from the light receiving elements 13, 14. A light emitting diode serves as the aforementioned light emitting element 12, and phototransistors or photodiodes serve as the light receiving elements 13, 14.

As illustrated in FIG. 4 and FIG. 5, the light emitting element 12 and the light receiving elements 13, 14 are mounted on the surface of the substrate 15. The optical path along which light radiates from the light emitting element 12 and the substrate 15 (mounting surface) are parallel to each other. The case 16 covers the sections of the light emitting element 12 and the light receiving elements 13, 14 that are mounted (FIG. 3).

The case 16 is made up of an upper case 17 and a lower case 18. The upper case 17 covers the surface of the substrate 15 on which the light emitting element 12 and the light receiving elements 13, 14 are mounted (mounting surface), and the lower case 18 covers the opposite surface (rear surface) of the substrate 15. The lens 19 is additionally held in the upper case 17 at the end part 15a of the substrate 15 in the direction light travels from light emitting element 12.

More specifically, the single light emitting element 12 and the two light receiving elements 13, 14 are aligned along the end part 15a with the light emitting element 12 arranged between the two light receiving elements 13, 14.

One of the two light receiving elements 13, 14, i.e., a first light receiving element 13 receives the light emitted from the light emitting element 12 and reflected in a single outgoing direction (specular reflection). The first light receiving element 13 primarily detects the density of the black toner. The other of the two light receiving elements 13, 14, i.e., a second light receiving element 14 receives the light emitted from the light emitting element 12 and reflected at many angles (diffuse reflection). The first light receiving element 13 primarily detects the density of the black toner.

The optical path of the light radiating from the light emitting element 12 does not form a right angle with the end part 15a. Let Q represent the intersection of the optical path of light exiting the light emitting element 12 and the transfer belt 56. Let L1 represent a perpendicular line from the transfer belt 56 at the intersection Q; L2 represent a straight line connecting the intersection Q and the light receiving element 13; L3 represent a straight line connecting the intersection Q and the light emitting element 12; and L4 represent a straight line connecting the intersection Q and the light receiving element 14. A relationship between the transfer belt 56, the light emitting element 12 and the light receiving elements 13, 14 is such that an angle θ1 between the perpendicular line L1 and the straight line L2 is equal to the angle θ2 between the perpendicular line L1 and the straight line L3; and an angle θ3 between the perpendicular line L1 and the straight line L4 is greater than the angle θ1 between the perpendicular line L1 and the straight line L2. By establishing the angles in this manner, the light receiving element 14 tends not to pickup specular reflections; that is, the configuration separates specular reflection and diffuse reflection, so that each kind of reflection light arrives at the respective light emitting element. Therefore, the accuracy of detecting the density of the individual toner colors improves.

To improve detection accuracy, the toner density sensor 11 is provided with a groove 21 and an insert 23 for insertion into the groove, at least between the light emitting element 12 and the light receiving element 13, or between the light emitting element 12 and the light receiving element 14 in the substrate 15. In this embodiment the groove 21 and insert 23 are formed between the light emitting element and both light receiving elements. Preferably, an insert 23 is formed from a light shielding material to effectively block the optical noise.

The groove 21 dips from the mounting surface in the thickness direction of the substrate 15. The groove 21 runs from the end part 15a of the substrate 15 and to between the light emitting element 12 and each of the light receiving elements 13 and 14. In other words, the groove 21 runs from the end part in the direction light travels from the light emitting element 12 to between the light emitting element 12 and the light receiving element 13 and to between the light emitting element 12 and the light receiving element 14. Another more desirable configuration of the embodiment is to lengthen the groove 21 past the light emitting element 12 and the light receiving elements 13, 14.

As illustrated in FIG. 6A, an insert 23 may be formed integrally with the inside of the upper case 17, and when inserted into the groove 21 the edge of the insert 23 may reach the lower surface (outer surface) of the lower case 18. Another preferable configuration of the embodiment is to lengthen an inserted portion 23a, which is the section of the insert 23 that is actually inside the groove 21, to reach the furthest end of the groove 21, opposite the end part 15a (FIG. 6B). The insert 23 may also be lengthened enough to protrude outside (in plan view) from the end part 15a of the substrate 15. Additionally, an upper insert portion 23b, which is the section of the insert 23 that sits above the inserted portion 23a and the substrate 15 inside the groove 21, may extend past the furthest end of the groove 21 to the mounting surface of the substrate 15.

Note that the insert 23 is preferably long enough to at least reach the end part 15a even if insert 23 does not protrude outside (in plan view) of the substrate 15 from the end part 15a.

The width W1 of the upper insert portion 23b (i.e., the dimension along the short side of the groove 21), which is the section of the insert 23 that sits above the inserted portion 23a and the substrate 15 inside the groove 21, may be the same as the width of the inserted portion 23a inside the groove 21. However, any variation in the depth of the groove 21 due to imperfections in the machining process may result in gaps between the groove 21 and the insert 23, even if the width of the insert 23 does not change. Therefore, as illustrated in FIG. 6A, the width W1 of the upper insert portion 23b located above the substrate 15 is preferably wide enough to not obstruct the light emitting element 12, the light receiving elements 13, 14 or other circuits placed on the substrate 15. That is, if W2 represents the dimension of the short side of the groove 21, the relationship between W1 and W2 is preferably, W1>W2.

Thus, this improves the level of contact between the substrate 15 and the upper case 17, which includes the insert 23. In addition, providing a more complex shape at the groove 21 and the insert 23 in the space around the inserted portion 23a obstructs the optical noise traveling through the space outside the substrate 15 from propagating through said insertion space and reaching the light receiving element 13 (14). Moreover, as is later described, if resin, such as the light shielding resin 29 (FIG. 8E) is injected into the groove 21, first, usually the inserted portion 23a is inserted after applying the resin to the groove 21. However, the drawback there is that the resin may spill out from the groove 21 because of issues with precision in machining the groove 21 or in applying the resin. In contrast, setting the width W1 of the upper insert portion 23b, which is the section above the substrate 15, to greater than the width W2 of the groove 21 allows the resin that spills out to be contained between the lower surface of the upper insert portion 23b and the substrate 15. This prevents the resin from flowing to other circuits or parts such as the light emitting element 12, and the light receiving elements 13, 14.

The above described configuration includes a groove 21 in the substrate 15 separating the light emitting element 12 and each of the light receiving elements 13, 14 and an insert 23 in each groove 21. The groove 21 and insert 23 effectively block both optical noise entering into the substrate 15 (FIG. 6A, arrow a), and optical noise advancing directly toward the light receiving element 13 (14) in the air above the substrate 15 (FIG. 6A, arrow Y1). Consequently the configuration minimizes the amount of optical noise reaching the light receiving elements 13, 14.

More specifically, the optical noise that enters inside the substrate 15 and travels therethrough exits the substrate 15 from the inner surface of the groove 21; therefore, less light remains inside the substrate 15 and is transmitted therethrough to exit the substrate 15 near the light receiving element 13 (14). At this point, of the light exiting from the inner surface of the groove 21 to outside the substrate 15, some light is re-incident on the opposite inner surface of the groove 21 and travels inside the substrate 15 toward the light receiving element 13 (14). Some light also travels through the air outside the substrate 15, and reaches the light receiving element 13 (14). However, these components are blocked by the inside of the groove 21 and above by the insert 23 in the groove 21. This effectively reduces the amount of optical noise that reaches the light receiving element 13 (14) above the substrate 15.

As above described, the insert 23 is preferably long enough to reach the end of the groove 21 opposite the end part 15a, and shaped to fill all the empty space in the groove 21. With this the insert 23 can effectively block the optical noise traveling through the substrate 15.

Figure 9:
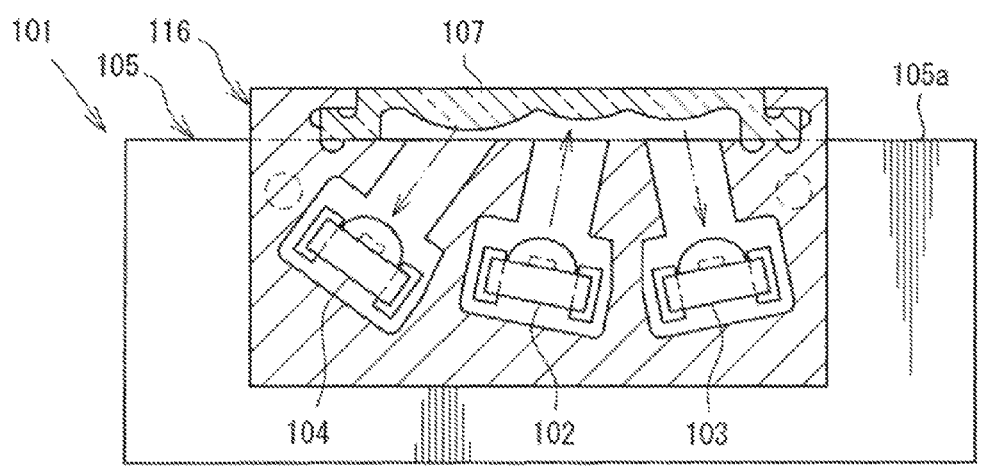
FIG. 9 is a front view illustrating the general configuration of an existing toner density sensor.
Figure 10:
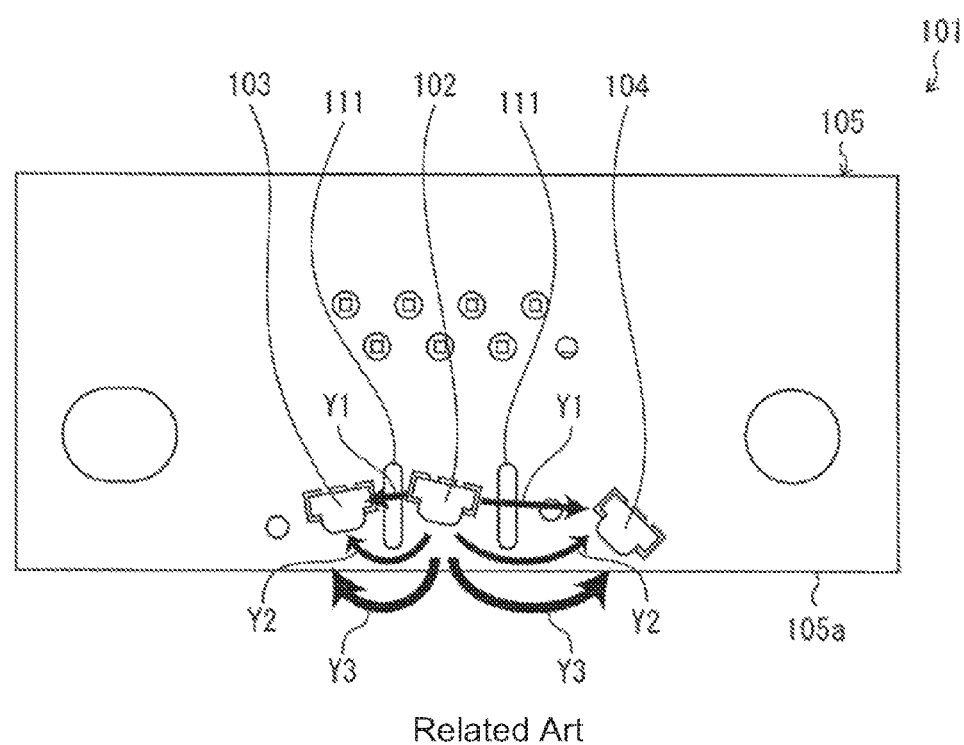
FIG. 10 is for describing a configuration example where a slotted through-hole is provided in the toner density sensor illustrated in FIG. 9.

As above described, a slit through-hole 111 can be provided in an existing toner density sensor 101, such as the toner density sensor 101 that achieves a smaller form factor (FIG. 9). Here, the slit through-hole can be the slotted through-hole 111 provided in the substrate 105 between the light emitting element 102 and the light receiving elements 103, 104 (FIG. 10). While this configuration is unable to block optical noise traveling through the air outside the substrate 105, which has a greater effect on detection accuracy, the configuration blocks optical noise within the toner density sensor 11.

Figure 7A:
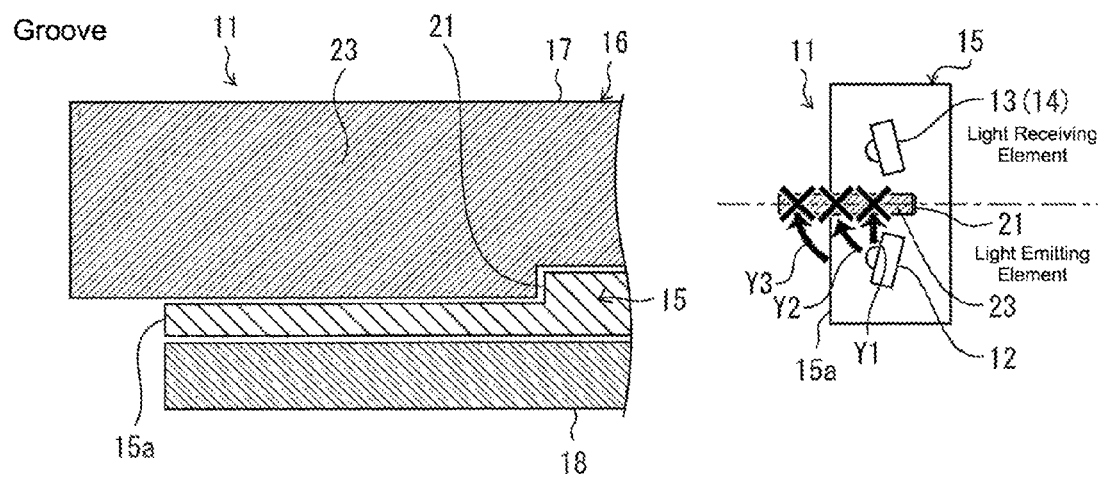
FIG. 7A through 7C illustrate how a toner density sensor with different configurations blocks optical noise.
Figure 7B:
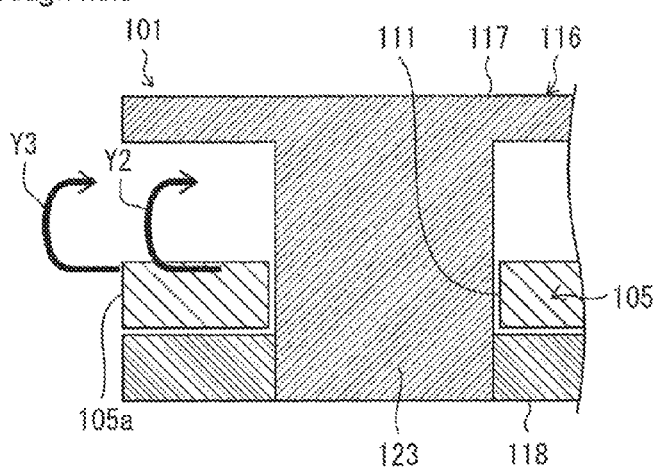
Figure 7B:
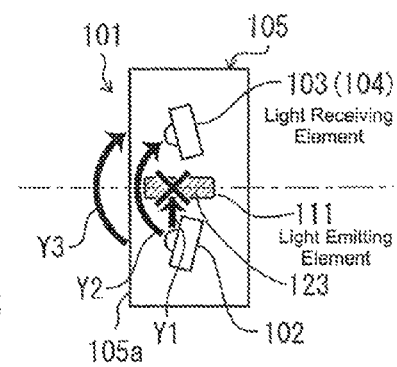
Figure 7C:
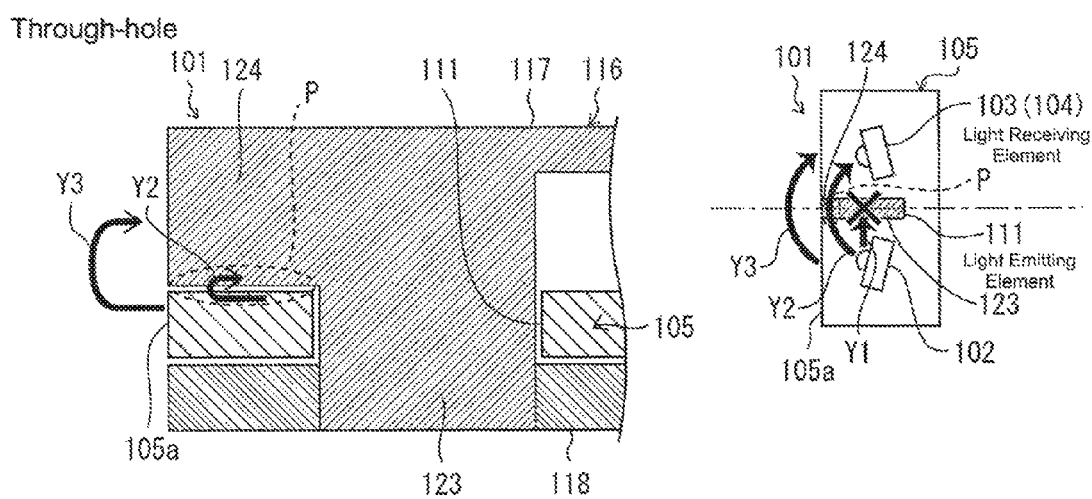

This situation is described with reference to FIGS. 7A, 7B, and 7C. FIG. 7A through 7C illustrate how a toner density sensor with different configurations blocks optical noise: FIG. 7A illustrates a toner density sensor according to the embodiment; FIG. 7B illustrates the toner density sensor in FIG. 9, with the slotted through-hole provided as in FIG. 10 and a light shielding component inserted therein; FIG. 7C illustrates a toner density sensor configured as in FIG. 7B with a light shielding component having a different shape. Note that in the drawing reference numerals 117 and 118 refer to the upper and lower cases that make up the case 116. In FIGS. 7B and 7C the light shielding component 123 inside the upper case 117, is integrally molded on the inside of the upper case 117, and the lower end of the light shielding component 123 reaches the lower surface of the lower case 118.

As illustrated in FIG. 7B, if a light shielding component 123 is sufficiently protruding above the substrate 105 (the mounting surface) when inserted in the through-hole 111, the light shielding component 123 can effectively block the optical noise traveling linearly along the substrate 105 toward the light receiving elements 103, 104 in the air outside the substrate 105 (arrow Y1).

However, even if the light shielding component 123 is of a sufficient height, the light shielding component 123 cannot block optical noise traveling in the plane of the substrate 105 (arrow Y2) nor can it block optical noise traveling outside the substrate 105 in the air in the plan view of the substrate 105 (arrow Y3).

Note that, as illustrated in FIG. 7C, conceivably, the shape of the light shielding component 123 is such that the light shielding component 123 extends above the substrate 105 at the end 105a and is incorporated into a wall 124. However, the precision in machining and assembling the upper case 117 is insufficient compared to the optical wavelength in use. Therefore, the optical noise may wrap around the front of the substrate 105, spread along the surface of the substrate 105 through a path P between the substrate 105 and the lower end of the wall 124 to reach the light receiving element 103 (104). Additionally, the optical noise traveling through the air outside the plane of the substrate 105 (arrow Y3) cannot be blocked.

In contrast, the groove 21 is formed from the end part 15a of the substrate 15 in the toner density sensor 11. Because the insert 23 is inserted in the groove 21 formed from the end part 15a of the substrate 15 as illustrated in FIG. 7A, the configuration clearly prevents optical noise traveling directly from the light emitting element 12 to the light receiving element 13 (14) (arrow Y1), but also effectively blocks optical noise that would travel around the end part 15a of the substrate 15 to reach the light receiving elements 13 (14).

Moreover, preferably, the insert 23 protrudes from the end part 15a of the substrate 15 in the toner density sensor 11 as depicted in FIG. 7A. Therefore, the configuration blocks the optical noise traveling in the air in the plane of the substrate 15, and improves detection accuracy.

The above described configuration ensures the groove 21 is long enough to reach behind the light emitting element 12 and the light receiving element 13 (14); therefore, the configuration prevents further propagation of the optical noise traveling inside the substrate 15 up to the portion behind the light emitting element 12 and the light receiving element 13 (14), and reduces the amount of optical noise.

Additionally, with the above configuration, the insert 23 is long enough to reach the furthest end of the groove 21 opposite the end part 15a when inserted into the groove 21. Therefore, the insert 23 effectively blocks optical noise up to the section at the furthest end of the groove 21. In particular, the insert 23 effectively blocks optical noise traveling along the substrate 15 that re-enters the substrate 15 from an opposing surface after exiting from the other inner surface of the groove 21 and travels toward the light receiving element 13 (14); the insert 23 also effectively blocks optical noise traveling toward the light receiving element 13 (14) through the air after exiting the inner surface of the groove 21, and optical noise traveling toward the light receiving element 13 (14) in the air in the plane of the substrate 15.

Another preferable configuration is to have the insert 23 protruding from the end part 15a of the substrate 15 outside the substrate 15 in the above mentioned configuration. However, the insert may merely be long enough to reach the end part 15a. Hereby, the insert 23 effectively blocks the optical noise up to the tip end of the groove 21. In particular, the insert effectively blocks optical noise traveling along the substrate 15 that re-enters the substrate 15 from an opposing inner surface after exiting from the other inner surface of the groove 21 and travels toward the light receiving element 13 (14); the insert 23 also effectively blocks optical noise traveling toward the light receiving element 13 (14) through the air after exiting the inner surface of the groove 21, and optical noise traveling toward the light receiving element 13 (14) in the air in the plane of the substrate 15.

A substrate 15 with a groove 21 exhibits better mechanical strength than a substrate 15 with a through-hole 111. However, the through-hole 111 is slightly better at blocking the optical noise traveling inside the substrate 15 than the groove 21. While that is the case, the detection accuracy of the sensor is less affected by the optical noise traveling inside the substrate 15 when the sensor is configured so that the light emitting element 12 and the light receiving elements 13, 14 are brought close together on the substrate 15 to reduce the size of the sensor as above described. Therefore, in reality the groove structure sufficiently blocks optical noise. Here, the depth of the groove 21 is preferably no less than half the thickness of the substrate 15. This effectively reduces the amount of optical noise that travels through the section below the groove 21 in the substrate 15 and reaches the light receiving elements 13, 14.

The light emitting element 12 and the light receiving elements 13, 14 may be arranged along the long side of the rectangular substrate 15, with the groove 21 extending along the short side of the substrate 15. The advantage is that the light emitting element 12 and the light receiving elements 13, 14 may be brought close to each other, thereby reducing the size of the toner density sensor 11.

Yet when providing a slotted through-hole to reduce the size of the toner density sensor, if the slotted through-hole 111 extends along the short side of the substrate 105 as illustrated in FIG. 10, the substrate 105 tends to break along the through-hole 111. However, providing the above mentioned kind of groove structure maintains the mechanical strength of the substrate 15 while achieving a reduced size and a solid construction.

Embodiments of the invention may be provided with a through-space 25 in the substrate 15, directly underneath at least one of the light receiving elements 13, 14 of the light receiving unit. In this embodiment, the through-space is under both the light receiving elements 13, 14. More specifically, the through-space lies between two lands (not shown) used for mounting the light receiving elements 13, 14 on the substrate 15 and pierces through the substrate 15 in the thickness direction. An insert 27 is also provided in the lower case 18 for insertion into this through-space 25.

The through-space 25 and the insert 27 also block the optical noise that would propagate inside the substrate 15 and reach the light receiving elements 13, 14, further improving the detection accuracy. The through-space 25 is described in Japanese Patent Publication (Grant) No. 5589914 (US Patent Application No. 2012/0237246).

Modification Examples

Next, examples for modifying the toner density sensor 11 are described. FIG. 8A through 8F are for describing examples of modifying a component in the toner density sensor. In the modification examples depicted in FIGS. 8A and 8B, the shape of the tip of a router bit (bit shape) is changed to create a trapezoidal or V-shaped cross-section in the width direction of the groove 21. The trapezoid or V cross-sectional shape in the width direction of the groove 21 causes the light advancing inside the substrate 15 to reflect or refract from the side surfaces (cross section) of the groove 21. Therefore, this reduces the overall amount of light progressing through the substrate 15, which exits the substrate 15. And, given that refraction is taking place, the trapezoid or V cross-sectional shape also reduces the component of light that exits from the side surface of the groove 21 near the light emitting element 12 and advances toward the light receiving element 13 (14). The configuration also reduces the amount of light that re-enters the substrate 15 from the side surface of the groove 21 near the light receiving element 13 (14) after exiting from the side surface of the groove 21 near the light emitting element 12, and propagates through the gap between the bottom of the groove 21 and the lower end of the insert 23.

Figure 8A:
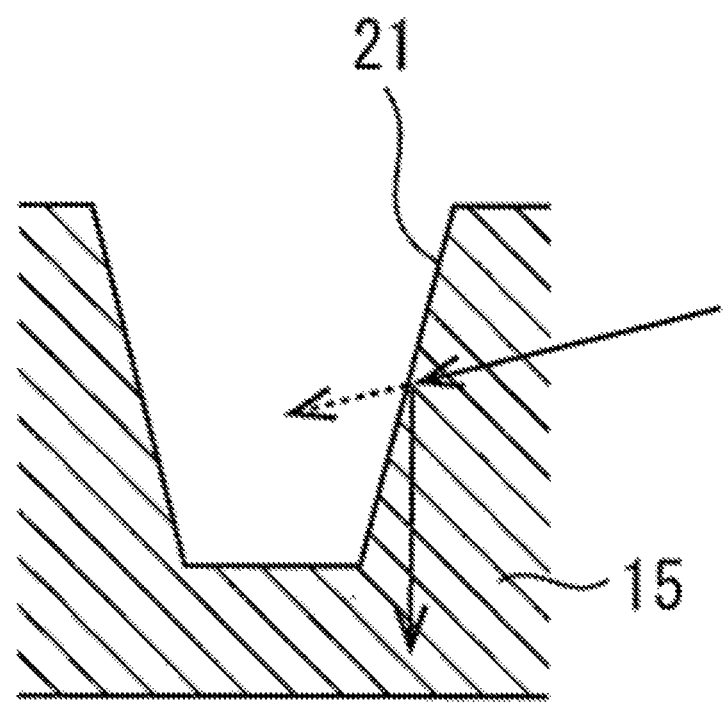
FIG. 8A through 8F are for describing examples of modifying components in the toner density sensor.
Figure 8B:
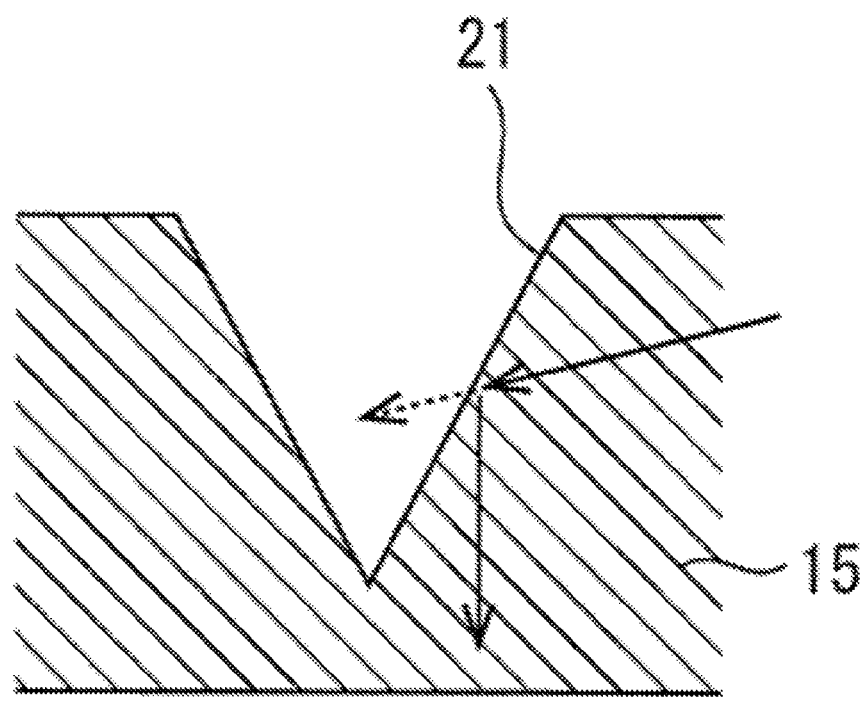
Figure 8C:
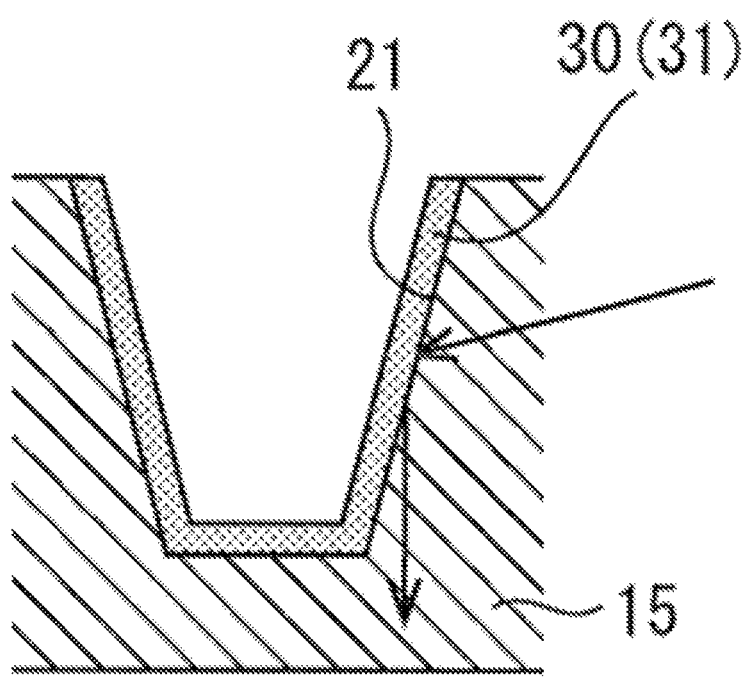
Figure 8D:
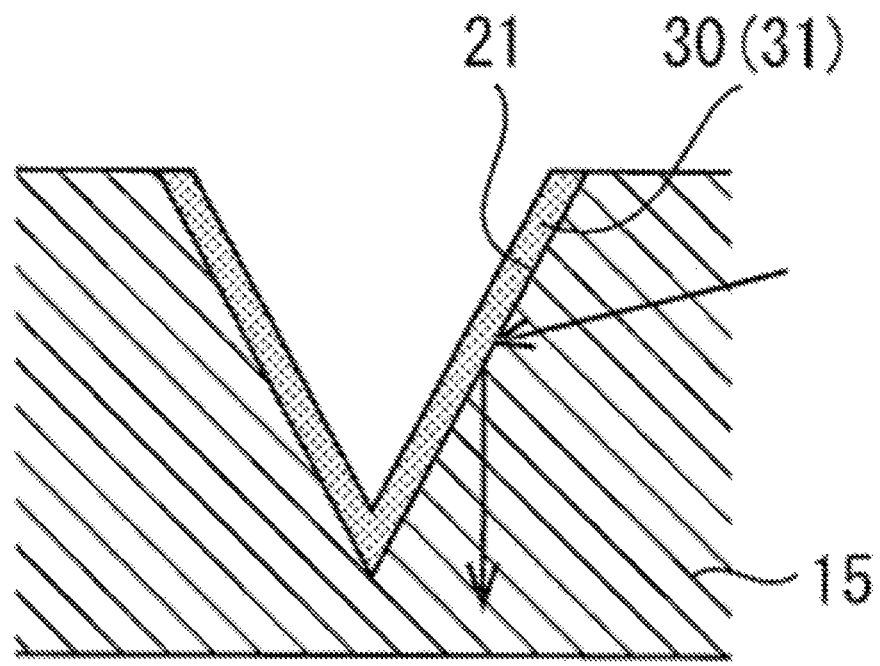

In the modification example depicted in FIGS. 8C and 8D, the inner surface (cross section) of the groove 21 is provided with a metal layer 30, or a resist layer 31 or both. Hereby the metal layer 30, or the resist layer 31 on the inner surface of the groove 21 reflects light advancing inside the substrate 15 toward the light emitting element 12 within the substrate 15, and thus the light no longer exits the substrate 15. As a result, there is no longer light that exits the substrate 15 from the groove 21 and advances toward the light receiving element 13 (14) in the space outside the substrate 15, nor is there light that exits from the inner surface of the groove 21, re-enters the groove 21 from the opposite inner surface and advances toward the light receiving element 13 (14). Therefore, the configuration effectively and even further reduces the amount of optical noise reaching the light receiving element 13 (14). Note that providing the metal layer 30 or the resist layer 31 is not limited to configurations where the groove 21 has a trapezoid or V-shaped cross-section. The layers may be combined with a configuration where the groove 21 is U-shaped.

Figure 8E:
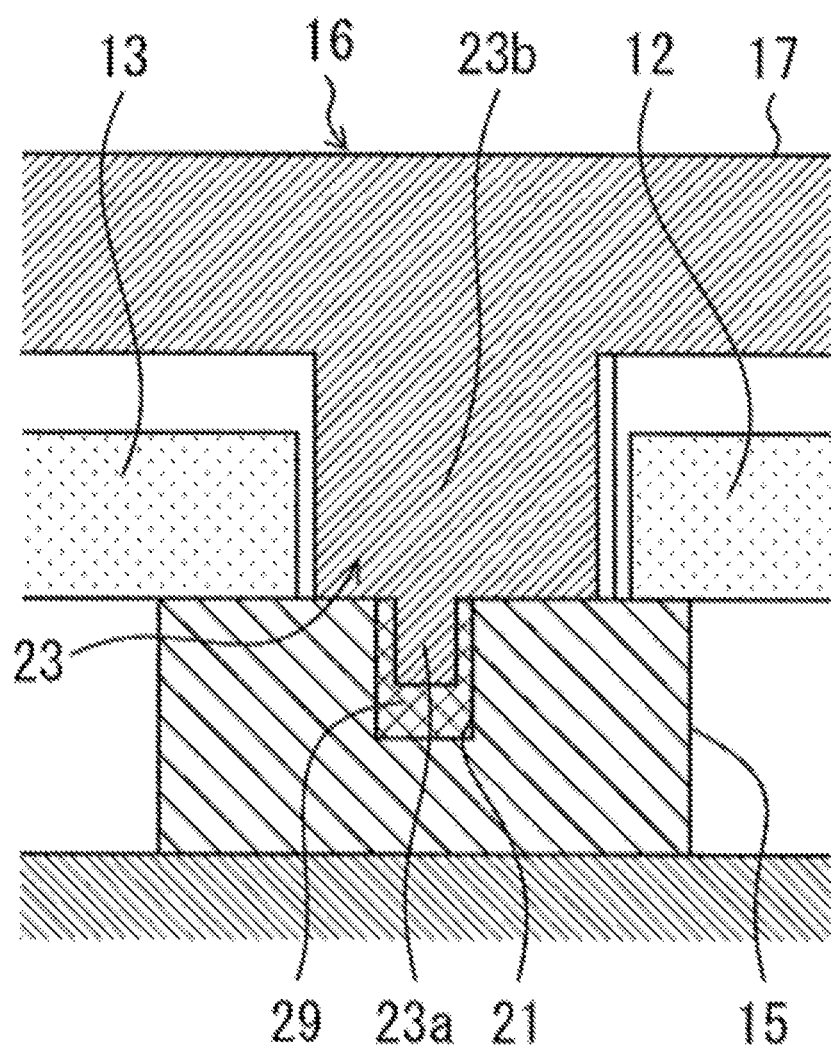

In the modification example depicted in FIG. 8E, the space between the groove 21 and the insert 23 is filled with a light shielding resin 29. This configuration blocks both the light exiting from the groove 21 and advancing toward the light receiving element in the space outside the substrate 15, and the light exiting from the inner surface of the groove 21, re-entering the substrate 15 from the opposite inner surface and advancing toward the light receiving element 13 (14). Therefore, the configuration effectively and even further reduces the amount of optical noise reaching the light receiving element 13 (14).

Note that filling in between the groove 21 and the insert 23 with the light shielding resin 29 is not limited to configurations where the groove 21 is U-shaped. The configuration may be combined with a groove 21 having a trapezoid shape or V shape and may also be combined with providing a metal layer 30, a resist layer 31 or both kinds of layers on the inner surface (cross section) of the groove 21.

Figure 8F:
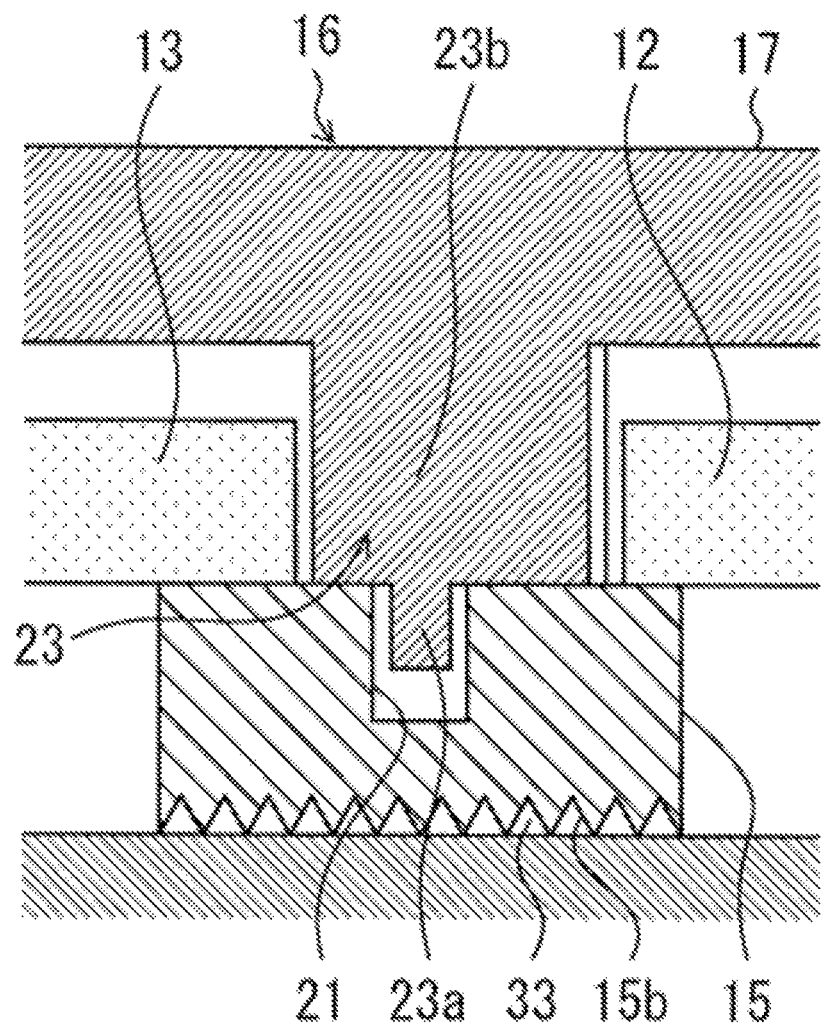

In the modification example depicted in FIG. 8F, the substrate 15 includes a corrugated surface 33 on the underside 15b at a section corresponding to the groove 21. The corrugated surface 33 is wider than the width of the groove 21. Hereby the light advancing inside the substrate 15 diffuses at the corrugated surface 33, reflects at the underside 15b of the substrate 15 and propagates toward the light receiving element 13 (14) inside the substrate 15. Consequently, the corrugated surface 33 reduces the amount of light propagating through the substrate 15 toward the light receiving element 13 (14). The corrugated surface 33 may be created by removing parts of the surface of the substrate 15. In this case, some light advancing inside the substrate 15 may exit to the outside from the corrugated surface 33 (i.e., exit from the side opposite the mounting surface of the substrate 15). Therefore, less light propagates inside the substrate 15 toward the light receiving element 13 (14). As a result, the light tends not to reach the light receiving element 13 (14), which is arranged on the outside of the substrate 15, and consequently, the configuration more effectively reduces the amount of optical noise.

In the above described example, the case 16 is made up of at least two components: an upper case 17 and a lower case 18. However, the case 16 may be just the upper case 17 with no lower case 18.

The present invention is not limited to each of the above described embodiments, and may be modified in various ways and remain within the scope of the claims. The technical means disclosed in each of the modification examples may be combined as appropriate, and an embodiment obtained in such a manner remains within the technical scope of the present invention.

The invention claimed is:

1. A toner density sensor comprising: a light emitting element configured to radiate light; a light receiving element configured to receive the light emitted from the light emitting element and reflected from a detection object; a substrate whereon the light emitting element and the light receiving element are surface mounted; a case covering the light emitting element and the light receiving element; an optical path configured parallel to the substrate for light generated from the light emitting element;

a non-through groove provided in the substrate from the end part of the substrate in the direction light travels from the light emitting element to between the light emitting element and the light receiving element, the groove recessed from the mounting surface in the thickness direction of the substrate; and an insert provided to the case and configured for insertion into the groove.

2. The toner density sensor according to claim 1, wherein the groove extends to behind the light emitting element and the light receiving element.

3. The toner density sensor according to claim 2, wherein the insert is long enough to reach the furthest part of the groove opposite said end part when inside the groove.

4. The toner density sensor according to claim 1, wherein the insert is long enough to reach the furthest part of the groove opposite said end part when inside the groove.

5. The toner density sensor according to any one of claims 1 through 3, wherein the insert is long enough to at least reach said end part of the substrate when inside the groove.

6. The toner density sensor according to claim 5, wherein the insert is long enough to protrude from said end part to outside the substrate when inside the groove.

7. The toner density sensor according to any one of claims 1 through 3, wherein the depth of the groove is no less than half the thickness of the substrate.

8. The toner density sensor according to any one of claims 1 through 3, wherein the cross-sectional shape of the groove widthwise is a V-shape or a trapezoidal shape.

9. The toner density sensor according to any one of claims 1 through 3 wherein the inner surface of the groove is provided with a metal layer, a resist layer, or both metal and resist layers.

10. The toner density sensor according to any one of claims 1 through 3, wherein the space between the groove and the insert is filled with a light shielding resin.

11. The toner density sensor according to any one of claims 1 through 3 further comprising: a corrugated surface provided at the underside of the substrate in a section corresponding to the groove, with the width of the corrugated surface wider than the groove.

12. An image forming device comprising: a toner density sensor according to any one of claims 1 through 3 mounted therein.

13. A toner density sensor comprising: a light emitting element configured to radiate light; a light receiving element configured to receive the light emitted from the light emitting element and reflected from a detection object; a substrate whereon the light emitting element and the light receiving element are surface mounted; a case covering the light emitting element and the light receiving element; an optical path configured parallel to the substrate for light generated from the light emitting element;

a groove provided in the substrate from the end part of the substrate in the direction light travels from the light emitting element to between the light emitting element and the light receiving element, the groove recessed from the mounting surface in the thickness direction of the substrate; and an insert provided to the case and configured for insertion into the groove, wherein the cross-sectional shape of the groove widthwise is a V-shape or a trapezoidal shape.

14. A toner density sensor comprising: a light emitting element configured to radiate light; a light receiving element configured to receive the light emitted from the light emitting element and reflected from a detection object; a substrate whereon the light emitting element and the light receiving element are surface mounted; a case covering the light emitting element and the light receiving element; an optical path configured parallel to the substrate for light generated from the light emitting element;

a groove provided in the substrate from the end part of the substrate in the direction light travels from the light emitting element to between the light emitting element and the light receiving element, the groove recessed from the mounting surface in the thickness direction of the substrate; and an insert provided to the case and configured for insertion into the groove, wherein the inner surface of the groove is provided with a metal layer, a resist layer, or both metal and resist layers.

15. A toner density sensor comprising: a light emitting element configured to radiate light; a light receiving element configured to receive the light emitted from the light emitting element and reflected from a detection object; a substrate whereon the light emitting element and the light receiving element are surface mounted; a case covering the light emitting element and the light receiving element; an optical path configured parallel to the substrate for light generated from the light emitting element;

a groove provided in the substrate from the end part of the substrate in the direction light travels from the light emitting element to between the light emitting element and the light receiving element, the groove recessed from the mounting surface in the thickness direction of the substrate; and an insert provided to the case and configured for insertion into the groove, wherein the space between the groove and the insert is filled with a light shielding resin.

* * * * *